(12) United States Patent
Liang

(10) Patent No.: US 8,379,335 B2
(45) Date of Patent: Feb. 19, 2013

(54) EXHAUSTING STRUCTURE FOR LENS

(75) Inventor: Yung-Fu Liang, Taichung County (TW)

(73) Assignee: Newmax Technology Co., Ltd., Wai Pu Hsiang, Tai-Chung County (TW)

( * ) Notice: Subject to any disclaimer, the term of this patent is extended or adjusted under 35 U.S.C. 154(b) by 145 days.

(21) Appl. No.: 13/016,465

(22) Filed: Jan. 28, 2011

(65) Prior Publication Data

US 2012/0194928 A1 Aug. 2, 2012

(51) Int. Cl.
*G02B 7/02* (2006.01)
(52) U.S. Cl. .................. 359/820; 359/822; 359/811
(58) Field of Classification Search .......... 359/694–704, 359/811–830
See application file for complete search history.

(56) References Cited

U.S. PATENT DOCUMENTS

| 6,215,605 B1 * | 4/2001 | Kuwana et al. ............... 359/824 |
| 7,990,629 B2 * | 8/2011 | Tang ............................. 359/811 |
| 2004/0109142 A1 * | 6/2004 | Gishi et al. ..................... 353/31 |

FOREIGN PATENT DOCUMENTS

TW M318732 9/2007

* cited by examiner

*Primary Examiner* — Mohammed Hasan
(74) *Attorney, Agent, or Firm* — Muncy, Geissler, Olds & Lowe, PLLC

(57) ABSTRACT

The present invention provides an exhausting structure for lens. The exhausting structure is used for being disposed and fixed between a lens and an optical apparatus. The exhausting structure is formed with an air channel. The air channel has a first opening and a second opening. A projecting outline of the first opening in a projecting direction is separated from a projecting outline of the second opening in the projecting direction. Thereby, the air channel allows air to flow therethrough. Further, an air pressure caused by the change of the temperature in the exhausting structure can be released so as to prevent the air from pressing the lens or apparatus. The exhausting structure can also prevent a light from entering into the base through the air channel.

20 Claims, 3 Drawing Sheets

EXHAUSTING STRUCTURE FOR LENS

BACKGROUND OF THE INVENTION

1. Field of the Invention

The present invention relates to an exhausting structure which is adapted to be disposed between an optical lens and an optical apparatus.

2. Description of the Prior Art

A conventional optical lens module is a lens barrel disposed with one or more lenses therein, so that the lens barrel can be disposed to a camera or other optical apparatus. To firmly fix the lens in the lens barrel, a colloid is applied between the lens and the lens barrel so as to glue the lens to the lens barrel.

However, the optical lens has a problem of focusing in a normal environment. Specifically, there is an enclosed space in a lens base or between the optical lens and the optical apparatus. The air in the enclosed space expands or contracts with the change of the temperature, so that the air will press the optical lens or the optical apparatus and change the distance between the optical lens and the optical apparatus. As a result, the image quality of the optical lens is affected, the accuracy of the focusing is decreased, and the image quality of the optical apparatus is then degraded.

To solve the above problem, some people drill a hole on the lens base, so that the air in the lens base can be released and the hole can then be sealed up to prevent an external light from entering therethrough. But said means often causes the lens base to contain some remaining air which expands to press the lens as the temperature of the lens base increases. Therefore, the lens will have a problem of focus deviation.

Moreover, some other people process a lens barrel to form an exhausting groove on the inner wall of the lens barrel, so that air can flow through the exhausting groove, as shown in TWM318732. Said lens barrel can mitigate the problem of air expanding to press the lens as the temperature increases; however, the above-mentioned means is to additionally process the lens barrel. As a result, it decreases the structural strength of the lens barrel, and it cannot be applied to an optical lens which is manufactured already.

As such, the present invention is arisen to obviate or at least mitigate the above mentioned disadvantages.

SUMMARY OF THE INVENTION

The main object of the present invention is to provide an exhausting structure, which is adapted to be disposed with an optical lens so as to obviate or mitigate a problem of imaging quality degradation by temperature.

To achieve the above and other objects, the present invention provides an exhausting structure for lens. The exhausting structure includes a fixing portion and a base.

The fixing portion is used for being disposed with an optical lens. The fixing portion is formed with a fixing hole, so that the optical lens can be received and positioned in the fixing hole.

The base is fixed to the fixing portion, and the base is formed with a space and an air channel. The space communicates with the fixing hole. The air channel has a first opening and a second opening. The first opening communicates with an external environment, and the second opening communicates with the space. A direction of the first opening defines a projecting direction. A projecting outline of the first opening in the projecting direction is separated from a projecting outline of the second opening in the projecting direction.

Thereby, the exhausting structure can make air flow in and out through the air channel, so that it can prevent air from expanding to press the optical lens or the optical apparatus as the temperature increases. Moreover, an external light cannot enter into the structure so that the focusing and the imaging of the lens can be accurate.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
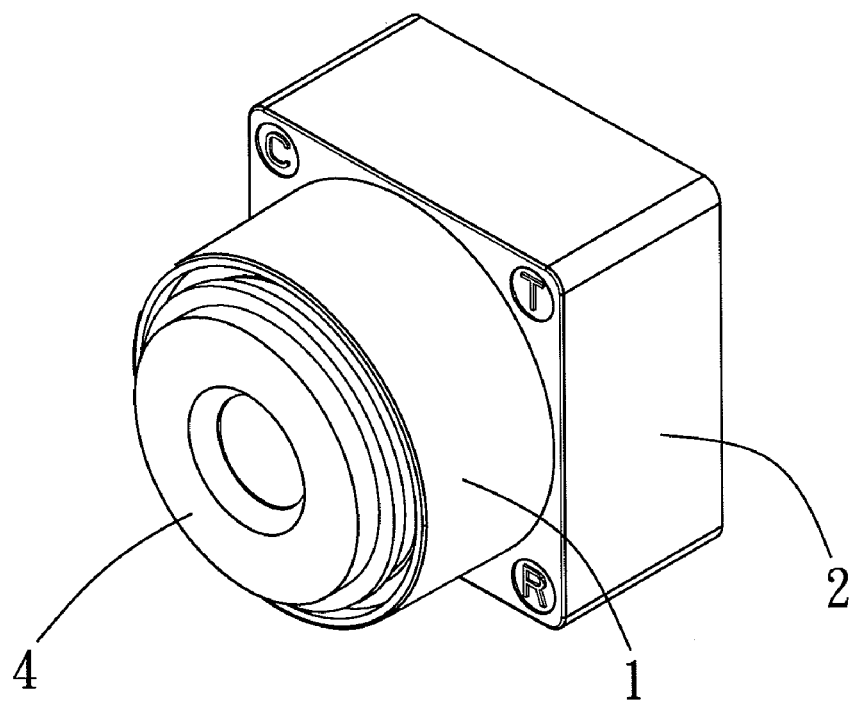
FIG. 1 is a stereogram showing an exhausting structure for lens in accordance with a preferred embodiment of the present invention.
Figure 2:
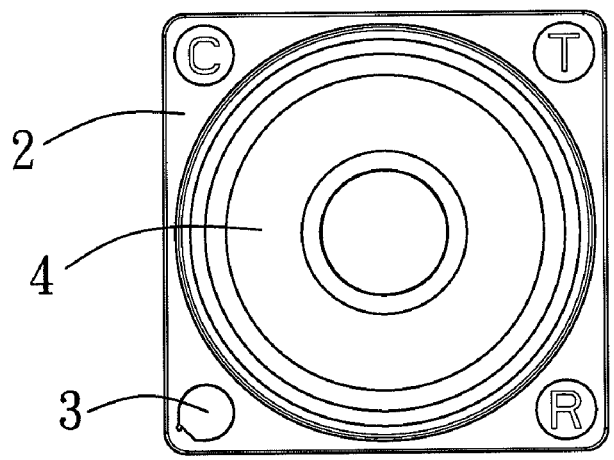
FIG. 2 is a front view showing an exhausting structure for lens in accordance with a preferred embodiment of the present invention.
Figure 3:
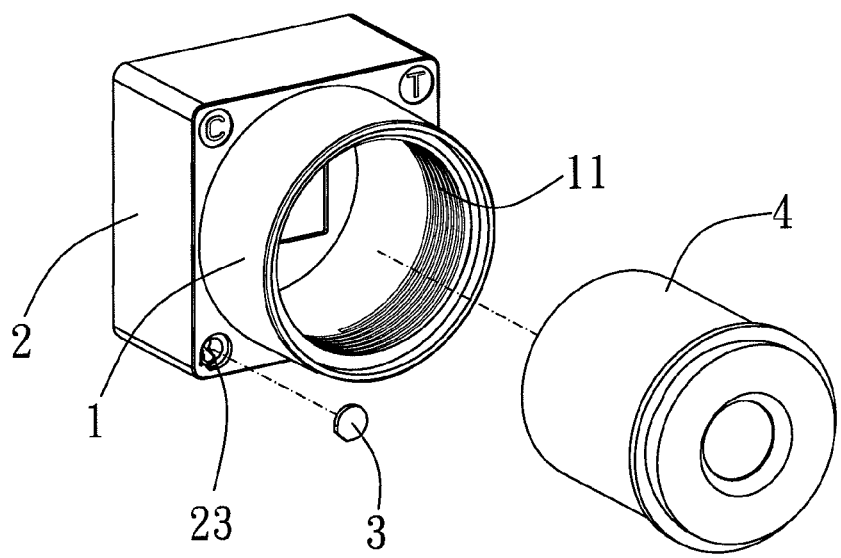
FIG. 3 is an exploded view showing an exhausting structure for lens in accordance with a preferred embodiment of the present invention.

Please refer to FIG. 1 to FIG. 3. The present invention provides an exhausting structure for lens. The exhausting structure includes a fixing portion 1 and a base 2. Preferably, the exhausting structure further includes a cover 3.

The fixing portion 1 is adapted to be disposed with an optical lens 4. The fixing portion 1 is formed with a fixing hole 11, so that the optical lens 4 can be received and positioned in the fixing hole 11. Specifically, the fixing portion is disposed with a thread, and the lens 4 is disposed with a corresponding thread (unshown), so that the lens 4 can be screwed into the fixing portion 1.

The base 2 is fixed to the fixing portion 1. The base 2 is formed with a space, and the space communicates with the fixing hole 11, so that a light which enters through the optical lens 4 is not blocked by the base 2. The base 2 can be connected to the fixing portion 1, or the base 2 and the fixing portion 1 can preferably be formed as one piece.

Figure 4:
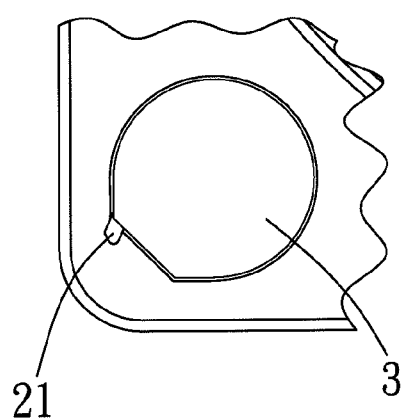
FIG. 4 is an enlarged view showing a part of an exhausting structure for lens in accordance with a preferred embodiment of the present invention.
Figure 5:
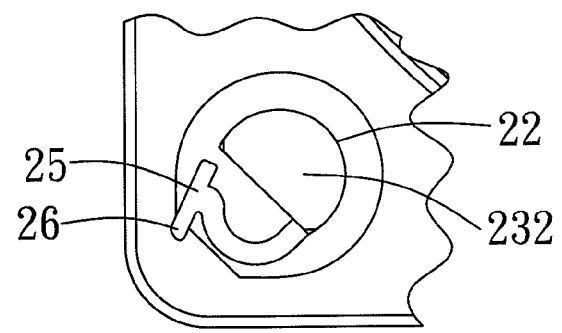
FIG. 5 is a prospective view of FIG. 4.

Please refer to FIG. 4 and FIG. 5. The base 2 is formed with an air channel. The air channel has a first opening 21 and a second opening 22. The first opening 21 communicates with an external environment, and the second opening 22 communicates with the space of the base 2. A direction of the first opening 21 defines a projecting direction. A projecting outline of the first opening 21 in the projecting direction is separated from a projecting outline of the second opening 22 in the projecting direction. In other words, the projecting outlines of the first and the second opening 21, 22 in the projection are not overlapped with each other.

Accordingly, the air channel allows air to flow between the space and the external environment, and the projecting outlines of the first and the second opening 21, 22 are separated from each other. Thereby, a light enters into the first opening 21, and the light then cannot pass through the second opening 22. As a result, the air channel can decrease or even avoid the possibility of the light entering into the space through the channel. Further, the more curved and complicated the air channel is, the less possibility of a light entering into the space through the air channel it will have. However, it may be a problem to make the air channel more curved and complicated. Therefore, the present invention provides an embodiment in which it is more convenient to make the shape of the air channel more complicated so as to prevent a light from entering therethrough. It should be noted that a wall of the air channel should be disposed with a light absorption layer (unshown), such as a flannelette layer or a colloid layer. Thereby, a light which enters into the first opening 21 cannot pass through the second opening 22.

Figure 6:
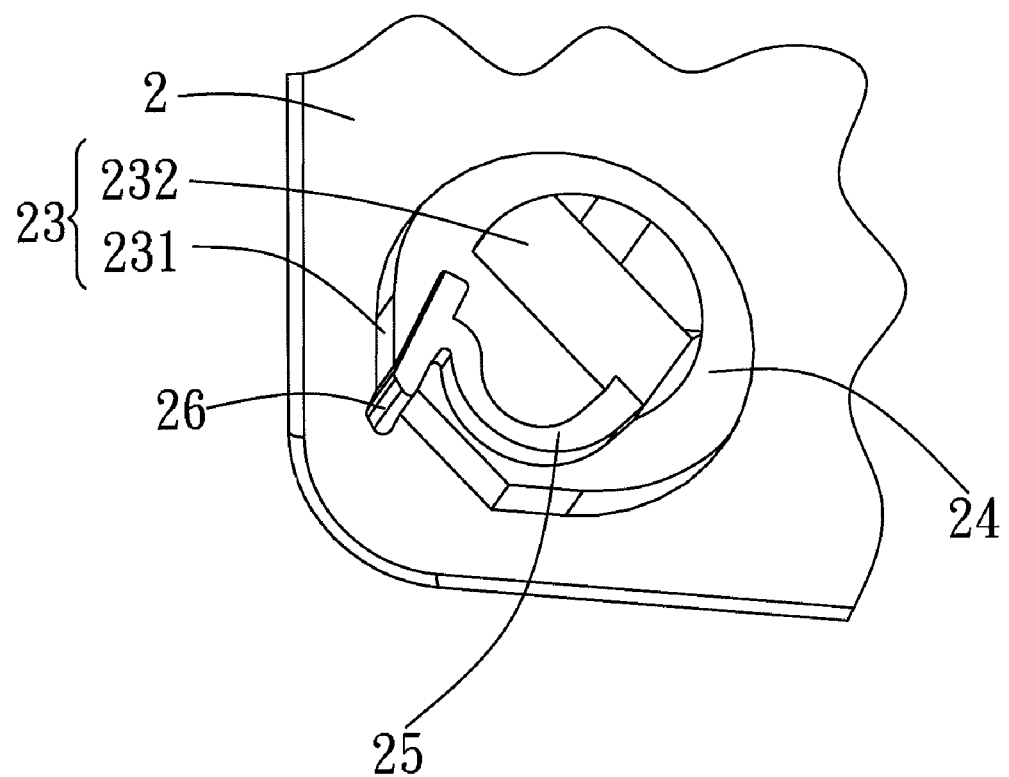
FIG. 6 is an enlarged view showing a part of a base of an exhausting structure for lens in accordance with a preferred embodiment of the present invention.

Please refer to FIG. 6. The base 2 is formed with a hole 23, a step surface 24, a groove 25, and a breach 26. A direction of the hole 23 defines an axial direction. The hole 23 has a large diameter section 231 and a small diameter section 232. The step surface 24 is located between the large diameter section 231 and the small diameter section 232. Preferably, the step surface 24 surrounds a periphery of the small diameter section 232. The breach 26 is located on a periphery of the large diameter section 231. Please refer FIG. 2 to FIG. 5. The cover 3 is received in the large diameter section 231, and the cover 3 covers the small diameter section 232. Preferably, the cover 3 and the large diameter section 231 have a non-circular cross section, so that a user can cover the hole 23 with the cover 3 according to the corresponding shape of each other. As shown in FIG. 2 and FIG. 3, the breach 26 is formed as an exhaust. The groove 25 communicates between the small diameter section 232 and the exhaust, so that the small diameter section 232, the groove 5 and the exhaust are formed as the air channel. The first opening 21 is located on the exhaust, and the second opening 22 is located on the small diameter section 232. Preferably, the groove 25 which communicates between the exhaust and the small diameter section 232 is a non-linear groove. More specifically, the groove may be formed by two unparallel linear grooves communicating with each other. The groove can also be formed by one or more curved grooves, or the groove can be formed by a linear groove and curved groove communicating with each other, as shown in FIG. 5. In the present embodiment, the small diameter section 232 is located between the large diameter section 231 and the space. In other possible embodiments of the present invention, the large diameter section 231 can communicate between the small diameter section 232 and the space, so that the first opening 21 is located on the small diameter section 232, and the second opening 22 is located on the exhaust.

Accordingly, in the present embodiment, the groove 25 is convenient to be formed with a more curved and complicated shape. After processing the groove 25, the small diameter section 232 can be covered with the cover 3 and the groove 25 is then formed as the air channel. Consequently, it can prevent a light from entering into the space through the air channel. In this embodiment, it should be noted that one end of the small diameter section 232, which communicates with the space, can be processed to expand outwardly. In this way, a projecting outline of the end of the small diameter section 231, which communicates with the space, may partly overlap with a projecting outline of the exhaust. However, the projecting outline of the second opening 22, which is located on another end of the small diameter section 232 and communicates with the large diameter section 231 is separated from the projecting outline of the exhaust or the first opening 21.

In another possible embodiment of the present invention, the embodiment has a similar structure, except that the base 2 is not formed with the breach 26. A cross sectional outline of the cover 3 is smaller than a cross sectional outline of the large diameter section 231, so that an exhaust is formed between the cover 3 and a periphery of the large diameter section 231. Thereby, the groove 25 communicates between the exhaust and the small diameter section 232. In addition, the cover can be formed with an exhaust, so that the exhaust communicates with the groove 25.

To sum up, the exhausting structure of the present invention can be disposed between an optical apparatus and an optical lens, so that air can flow through the air channel. If the air in the space expands or contracts as the temperature changes, the air can then flow out of the space, so that it can prevent the lens or the lens base from being pressed by the air.

What is claimed is:

1. An exhausting structure for lens, comprising:
a fixing portion, adapted to be disposed with an optical lens, the fixing portion being formed with a fixing hole, the optical lens being received and positioned in the fixing hole;
a base, fixed to the fixing portion, the base being formed with a space, the space communicating with the fixing hole, the base being formed with an air channel, the air channel having a first opening and a second opening, the first opening communicating with an external environment, the second opening communicating with the space, a direction of the first opening defining a projecting direction, a projecting outline of the first opening in the projecting direction being separated from a projecting outline of the second opening in the projecting direction;
wherein the air channel extends continuously in a side wall of the base, the first opening is opened on an outer surface of the side wall, the second opening is opened on an inner surface of the side wall, and a light which enters into the first opening in a direction is unable to pass through the second opening in the direction.

2. The exhausting structure for lens of claim 1, wherein the exhausting structure further comprises a cover, the base is formed with a hole, a step surface, and a groove, the hole defines an axial direction, the hole has a large diameter section and a small diameter section, the step surface is located between the large diameter section and the small diameter section, the cover is received in the large diameter section, the cover covers the small diameter section, a cross sectional outline of the cover is smaller than a cross sectional outline of the large diameter section, so that an exhaust is formed between the cover and a periphery of the large diameter section, the groove communicates between the small diameter section and the exhaust, so that the small diameter section, the groove and the exhaust are formed as the air channel, one of the first and the second opening is located on the small diameter section, and the other one of the first and the second opening is located on the exhaust.

3. The exhausting structure for lens of claim 1, wherein the exhausting structure further comprises a cover, the base is formed with a hole, a step surface, and a groove, the hole defines an axial direction, the hole has a large diameter section and a small diameter section, the step surface is located between the large diameter section and the small diameter section, the cover is received in the large diameter section, the cover covers the small diameter section, the cover is formed with an exhaust, the exhaust is separated from the small diameter section, the groove communicates between the small diameter section and the exhaust, so that the small diameter section, the groove and the exhaust are formed as the air channel, one of the first and the second opening is located on the small diameter section, and the other one of the first and the second opening is located on the exhaust.

4. The exhausting structure for lens of claim 1, wherein the exhausting structure further comprises a cover, the base is formed with a hole, a step surface, a groove, and a breach, the hole defines an axial direction, the hole has a large diameter section and a small diameter section, the step surface is located between the large diameter section and the small diameter section, the breach is located on a periphery of the large diameter section, the cover is received in the large diameter section, the cover covers the small diameter section, so that the breach is formed as an exhaust, the groove communicates between the small diameter section and the exhaust, so that the small diameter section, the groove and the exhaust are formed as the air channel, one of the first and the second opening is located on the small diameter section, and the other one of the first and the second opening is located on the exhaust.

5. The exhausting structure for lens of claim 2, wherein the large diameter section and the cover have a non-circular cross section.

6. The exhausting structure for lens of claim 3, wherein the large diameter section and the cover have a non-circular cross section.

7. The exhausting structure for lens of claim 4, wherein the large diameter section and the cover have a non-circular cross section.

8. The exhausting structure for lens of claim 2, wherein the step surface surrounds a periphery of the small diameter section.

9. The exhausting structure for lens of claim 3, wherein the step surface surrounds a periphery of the small diameter section.

10. The exhausting structure for lens of claim 4, wherein the step surface surrounds a periphery of the small diameter section.

11. The exhausting structure for lens of claim 2, wherein the groove, which communicates between the exhaust and the small diameter section, is a non-linear groove.

12. The exhausting structure for lens of claim 3, wherein the groove, which communicates between the exhaust and the small diameter section, is a non-linear groove.

13. The exhausting structure for lens of claim 4, wherein the groove, which communicates between the exhaust and the small diameter section, is a non-linear groove.

14. The exhausting structure for lens of claim 2, wherein the groove comprises at least one curved groove.

15. The exhausting structure for lens of claim 3, wherein the groove comprises at least one curved groove.

16. The exhausting structure for lens of claim 4, wherein the groove comprises at least one curved groove.

17. The exhausting structure for lens of claim 2, wherein a wall of the air channel is disposed with a light absorption layer.

18. The exhausting structure for lens of claim 3, wherein a wall of the air channel is disposed with a light absorption layer.

19. The exhausting structure for lens of claim 4, wherein a wall of the air channel is disposed with a light absorption layer.

20. The exhausting structure for lens of claim 17, wherein the light absorption layer is one of a flannelette layer and a colloid layer.

* * * * *